(12) United States Patent
Garrett et al.

(10) Patent No.: US 11,943,688 B2
(45) Date of Patent: Mar. 26, 2024

(54) SYNCHRONIZATION BETWEEN DEVICES IN EMERGENCY VEHICLES

(71) Applicant: WHELEN ENGINEERING COMPANY, INC., Chester, CT (US)

(72) Inventors: Caleb Garrett, Chester, CT (US); Brandon Conlon, Chester, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 843 days.

(21) Appl. No.: 16/983,577

(22) Filed: Aug. 3, 2020

(65) Prior Publication Data
US 2021/0043081 A1 Feb. 11, 2021

Related U.S. Application Data

(63) Continuation-in-part of application No. 16/815,988, filed on Mar. 11, 2020.

(60) Provisional application No. 62/884,871, filed on Aug. 9, 2019.

(51) Int. Cl.
*H04W 4/46* (2018.01)
*H04L 12/40* (2006.01)

(52) U.S. Cl.
CPC ........... *H04W 4/46* (2018.02); *H04L 12/40* (2013.01); *H04L 2012/40215* (2013.01); *H04L 2012/40273* (2013.01)

(58) Field of Classification Search
CPC ..... H04W 4/46; H04L 12/40; H04L 12/40273
USPC ........................................... 340/902
See application file for complete search history.

(56) References Cited

U.S. PATENT DOCUMENTS

| 2012/0303212 | A1* | 11/2012 | Miller | G08B 7/06 701/36 |
| 2019/0206231 | A1* | 7/2019 | Armstrong | G08B 25/10 |
| 2019/0326916 | A1* | 10/2019 | Parra Vilchis | H04L 67/1059 |

OTHER PUBLICATIONS

Notification of Transmittal of the International Search Report and The Written Opinion of the International Searching Authority, or the Declaration for International Application No. PCT/US2020/022141 dated Aug. 24, 2020.

* cited by examiner

*Primary Examiner* — Ted M Wang
(74) *Attorney, Agent, or Firm* — HOGAN LOVELLS US LLP

(57) ABSTRACT

A system, method and storage medium for synchronization between nodes includes transmitting, by a first node, a first synchronization message; determining, by the first node, a first time at which the first synchronization message is transmitted; transmitting, by the first node, a second synchronization message containing a tx timestamp corresponding to the first time; receiving, by a second node, the first synchronization message from the first node; determining, by the second node, a second time at which the first synchronization message is received; storing, by the second node, a rx timestamp corresponding the second time; receiving, by the second node, the second synchronization message from the first node; determining, by the second node, a current local time at which the second synchronization message is received; reading, by the second node, the tx timestamp in the first synchronization message; adjusting, by the second node, the current local time of the second node by adding a difference between the tx timestamp and the rx timestamp; and setting, by the second node, the adjusted current local time as a global time.

29 Claims, 9 Drawing Sheets

SYNCHRONIZATION BETWEEN DEVICES IN EMERGENCY VEHICLES

CROSS REFERENCE TO RELATED APPLICATION

This patent application claims the benefit of U.S. Provisional Application No. 62/884,871, filed on Aug. 9, 2019, and is a continuation-in-part of U.S. application Ser. No. 16/815,988, filed Mar. 11, 2020, the entire disclosure of each of which are incorporated by reference herein.

TECHNICAL FIELD

This application relates to a system and method for synchronizing various peripherals located in a same emergency vehicle or different emergency vehicles.

BACKGROUND

Time synchronization between peripherals such as sirens or light bars in EVs have become more important for maximizing the effect of an alert such as informing the presence of the emergency vehicle to as many of people as possible, so the emergency vehicle can pass the traffic safely. However, emergency vehicles currently do not contain a means of synchronizing peripherals located within the same vehicle or between vehicles or whatsoever, which could result in ambiguity in messages relayed to drivers.

SUMMARY OF THE INVENTION

In one aspect, there is provided a synchronization system between two or more nodes. The system includes a master node and a slave node. The master node is configured to transmit a first synchronization message, determine a first time at which the first synchronization message is transmitted, and store a tx timestamp corresponding to the first time into a memory. The master node is further configured to transmit a second synchronization message containing the tx timestamp corresponding to the first time. Further, the slave node is configured to receive the first synchronization message from the master node, determine a second time at which the first synchronization message is received, and store a rx timestamp corresponding the second time. The second node is further configured to receive the second synchronization message from the first node, determine a current local time at which the second synchronization message is received, read the tx timestamp in the second synchronization message, adjust the current local time of the slave node by adding a difference between the tx timestamp and the rx timestamp to the current local time, and setting the adjusted current local time as a global time.

In one embodiment, the master node and the slave node may be located in an emergency vehicle.

In one embodiment, the master node may be a main controller, and the slave node may be one of an emergency sound generator, an emergency light generator, and an I/O device.

In one embodiment, the master node may include a master timer, and the slave node may include a local timer. The slave node may further include a proportional-integral-derivative (PID) controller. The PID controller is configured to, for every predetermined time period, compensate for a time drift of the local timer with respect to the master timer.

In one embodiment, the PID controller is configured to tune a rate at which the local timer of the slave node increments by actively adjusting a reload value of the local timer based on the following equation:

$$u(t) = K_p e(t) + K_i \int_0^t e(t')dt' + K_d \frac{de(t)}{dt},$$

wherein u(t) is an adjustment amount added to the reload value of the local timer, $K_p$, $K_i$, and $K_d$ are constants, and e(t) is the difference between the tx timestamp and the rx timestamp.

In one embodiment, the system may further include another slave node. The another slave node may be configured to receive the first synchronization message from the master node, determine a third time at which the first synchronization message is received, and store another rx timestamp corresponding to the third time, receive the second synchronization message from the master node, determine another current local time at which the second synchronization message is received, read the tx timestamp in the second synchronization message, adjust the another current local time of the another slave node by adding another difference between the tx timestamp and the another rx timestamp to the another current local time or adjusting the auto reload register of another local timer using the PID method listed above, and set the adjusted another current local time as another global time. The global time set by the slave node is equal to the another global time set by the another slave node, so that the slave node and the another slave node can be synchronized one to another via the master node.

In one embodiment, the slave node including a first emergency sound generator may generate a first tone signal based on a first output sequence stored in the memory, and the another slave node including a second emergency sound generator may generate a second tone signal based on a second output sequence stored in the memory. Each of the first output sequence and the second output sequence may be repeated for every predetermined time period, and during the predetermined time period, a length of the first output sequence may be equal to that of the second output sequence.

In one embodiment, the first tone signal and the second tone signal may be synchronized one to another to generate a combined emergency sound.

In one embodiment, the slave node including an emergency sound generator may generate a first tone signal based on a first output sequence stored in the memory, and the another slave node including an emergency light generator may generate a second tone signal based on a second output sequence stored in the memory. Each of the first output sequence and the second output sequence may be repeated for every predetermined time period, and during the predetermined time period, a length of the first output sequence may be equal to that of the second output sequence.

In one embodiment, the first tone signal and the second tone signal may respectively generate an emergency sound and an emergency light synchronized one to another.

In one embodiment, the first output sequence may include sound volume level information. To generate the first tone signal based on the first output sequence stored in the memory, the slave node may be configured to calculate a start point in the first output sequence at which the first tone signal starts to be generated. In addition, to generate the second tone signal based on the second output sequence stored in the memory, the another slave node may be configured to calculate another start point in the second output sequence at which the second tone signal starts to be generated. The start point in the first output sequence calculated by the slave node may be equal to the another start point in the second output sequence calculated by the another slave node.

In one embodiment, the master node may transmit the first and second synchronization messages over a controller area network (CAN).

In another aspect of the present disclosure, there is provided a synchronization method between two or more nodes. The method includes transmitting, by a master node, a first synchronization message; determining, by the master node, a first time at which the first synchronization message is transmitted; and transmitting, by the master node, a second synchronization message containing a tx timestamp corresponding to the first time. The method further includes: receiving, by a slave node, the first synchronization message from the master node; determining, by the slave node, a second time at which the first synchronization message is received; storing, by the slave node, a rx timestamp corresponding to the second time; receiving, by the slave node, the second synchronization message from the master node; determining, by the slave node, a current local time at which the second synchronization message is received; reading, by the slave node, the tx timestamp in the second synchronization message; adjusting, by the slave node, the current local time of the second node by adding a difference between the tx timestamp and the rx timestamp to the current local time; and setting, by the slave node, the adjusted current local time as a global time.

In still another aspect of the present disclosure, there is provided a computer-readable storage medium having computer readable program instructions. The computer readable program instructions can be read and executed by at least one processor for performing a synchronization method between two or more nodes. The method includes transmitting, by a master node, a first synchronization message; determining, by the master node, a first time at which the first synchronization message is transmitted; and transmitting, by the master node, a second synchronization message containing a tx timestamp corresponding to the first time. The method further includes: receiving, by a slave node, the first synchronization message from the master node; determining, by the slave node, a second time at which the first synchronization message is received; storing, by the slave node, a rx timestamp corresponding to the second time; receiving, by the slave node, the second synchronization message from the master node; determining, by the slave node, a current local time at which the second synchronization message is received; reading, by the slave node, the tx timestamp in the second synchronization message; adjusting, by the slave node, the current local time of the second node by adding a difference between the tx timestamp and the rx timestamp to the current local time; and setting, by the slave node, the adjusted current local time as a global time.

In still yet another aspect of the present disclosure, there is provided a synchronization system. The system includes a global time source and a node. The global time source is configured to transmit a periodic pulse signal which is repeated for every predetermined time period, determine a first time corresponding to a rising edge of the pulse signal, transmit a synchronization message containing a tx timestamp corresponding to the first time. The node is configured to receive the period pulse signal from the global time source, trigger an internal timer upon the rising edge of the pulse signal, determine a second time at which the internal timer is triggered, store a trigger timestamp corresponding to the second time. The node is further configured to receive the synchronization message, determine a current local time at which the synchronization message is received, read the tx timestamp in the synchronization message, adjust the current local time of the node by adding a difference between the tx timestamp and the trigger timestamp to the current local time, and setting the adjusted current local time as a global time.

In one embodiment, the system may further include another node. The another node may be configured to receive the period pulse signal from the global time source, trigger another internal timer upon the rising edge of the pulse signal, determine a third time at which the another internal timer is triggered, store another trigger timestamp corresponding to the third time. The another node may be further configured to receive the synchronization message, determine another current local time at which the synchronization message is received, read the tx timestamp in the synchronization message, adjust the another current local time of the another node by adding another difference between the tx timestamp and the another trigger timestamp to the another current local time, and setting the another adjusted current local time as another global time. The global time set by the node may be equal to the another global time set by the another node, so that the node and the another node are synchronized one to another via the global time source.

In one embodiment, the global time source may be a satellite based navigation system. The node may be located in a first emergency vehicle, and the another node may be located in a second emergency vehicle.

In one embodiment, the node may be a main controller of the first emergency vehicle, and the another node may be another main controller of the second emergency vehicle.

In one embodiment, the first emergency vehicle may further include one or more peripherals, and when the main controller is synchronized to the global time source, the one or more peripherals may be synchronized to the main controller. In addition, the second emergency vehicle may further include another one or more peripherals, and when the another main controller is synchronized to the global time source, the another one or more peripherals may be synchronized to the another main controller.

In one embodiment, to synchronize the one or more peripherals to the main controller, the main controller may be configured transmit a first synchronization message, determine a fourth time at which the first synchronization message is transmitted, transmit a second synchronization message containing a first tx timestamp corresponding to the fourth time. In addition, each of the one or more peripherals may be configured to: receive the first synchronization message from the main controller, determine a fifth time at which the first synchronization message is received, store a first rx timestamp corresponding to the fifth time, receive the second synchronization message from the main controller, determine a first current local time at which the second synchronization message is received, read the first tx timestamp in the second synchronization message, adjust the first current local time of each of the one or more peripheral by adding a difference between the first tx timestamp and the first rx timestamp to the first current local time, and set the adjusted first current local time as the global time.

In one embodiment, the one or more peripherals may include an emergency sound generator, an emergency light generator, and an I/O device.

In one embodiment, the node may further include a PID controller, so that for every predetermined time period, the PID controller may be configured to compensate for a time drift of a local timer of the node with respect to a timer of the global time source.

In one embodiment, a first peripheral of the one or more peripherals including a first emergency sound generator may generate a first tone signal based on a first output sequence stored in at least one memory, and a second peripheral of the another one or more peripherals including a second emergency sound generator may generate a second tone signal based on a second output sequence stored in the at least one memory. Each of the first output sequence and the second output sequence may be repeated for every predetermined time period, and during the predetermined time period, a length of the first output sequence may be equal to that of the second output sequence.

In one embodiment, the first tone signal and the second tone signal may be synchronized one to another to generate a combined emergency sound.

In still yet another aspect of the present disclosure, there is provided a synchronization method. The method includes: transmitting, by a global time source, a periodic pulse signal which is repeated for every predetermined time period; determining, by the global time source, a first time corresponding to a rising edge of the pulse signal; transmitting, by the global time source, a synchronization message containing a tx timestamp corresponding to the first time. The method further includes: receiving, by a node, the period pulse signal; triggering, by the node, an internal timer upon the rising edge of the pulse signal; determining, by the node, a second time at which the internal timer is triggered; storing, by the node, a trigger timestamp corresponding to the second time; receiving, by the node, the synchronization message; determining, by the node, a current local time at which the synchronization message is received; reading, by the node, the tx timestamp in the synchronization message; adjusting, by the node, the current local time of the node by adding a difference between the tx timestamp and the trigger timestamp; and setting, by the node, the adjusted current local time as a global time.

In still yet another aspect of the present disclosure, there is provided a computer-readable storage medium having computer readable program instructions. The computer readable program instructions can be read and executed by at least one processor for performing a synchronization method. The method includes: transmitting, by a global time source, a periodic pulse signal which is repeated for every predetermined time period; determining, by the global time source, a first time corresponding to a rising edge of the pulse signal; transmitting, by the global time source, a synchronization message containing a tx timestamp corresponding to the first time. The method further includes: receiving, by a node, the period pulse signal; triggering, by the node, an internal timer upon the rising edge of the pulse signal; determining, by the node, a second time at which the internal timer is triggered; storing, by the node, a trigger timestamp corresponding to the second time; receiving, by the node, the synchronization message; determining, by the node, a current local time at which the synchronization message is received; reading, by the node, the tx timestamp in the synchronization message; adjusting, by the node, the current local time of the node by adding a difference between the tx timestamp and the trigger timestamp; and setting, by the node, the adjusted current local time as a global time.

BRIEF DESCRIPTION OF THE DRAWINGS

The present disclosure will become more readily apparent from the specific description accompanied by the drawings.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Figure 1:
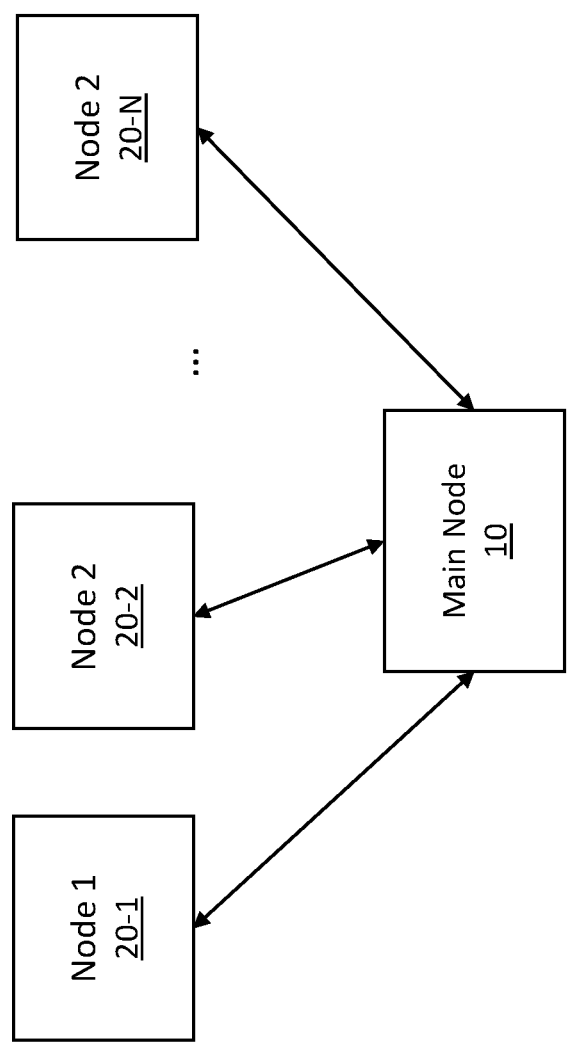
FIG. 1 is a view illustrating a synchronization among a master node and slave nodes cording to an embodiment of the present disclosure.

FIG. 1 is a view illustrating a synchronization among a master node 10 and slave nodes 20-1 to 20-N according to an embodiment of the present disclosure. Here, N is an integer equal to or more than one. The slave nodes 20-1 to 20-N are synchronized to the master node 10.

Further, the nodes 10 and 20-1 to 20-N are located in the same emergency vehicle (EV), or are located over different multiple EVs.

The case where the nodes 10 and 20-1 to 20-N are located in the same EV can be understood to mean a "synchronization between nodes in the same EV". In this case, the master node 10 may include a main controller with one or more processor (not shown) and the slave nodes 20-1 to 20-N may be peripheral devices (or peripherals) such as an emergency sound generation node (e.g., siren), an emergency light generation node (e.g., light bar), an I/O device, or the like. In this case, each of the nodes 20-1 to 20-N is in communication with the master node 10 over e.g., a CAN bus network, so that synchronization messages each containing a timestamp are exchanged.

For example, a modified CANOpen stack protocol, i.e., WeCANX, can be used to transmit the synchronization messages from the master node 10 to each of the slave nodes 20-1 to 20-N for every predetermined time period (e.g., 1 second). However, embodiments of the present disclosure are not limited thereto; for example, any other point-to-point or multidrop communication schemes running a multitude of protocols can also be used for transmitting the synchronization messages.

An internal timer (not shown) of the master node 10 generates a global time to which a local timer (not shown) of each slave node 20-1 to 20-N is synchronized. In some embodiments, the global time can be provided with an accuracy of ~100 nsec from an external global time source. The global time source may include a satellite based time source (150 of FIG. 3A) such as a global navigation satellite system (GNSS), a global position system (GPS), or the like. In another embodiment, the global time can be provided using existing communication networks such as wireless cellular networks.

For example, the GNSS transmitter transmits a global timestamp over a universal asynchronous receiver/transmitter (UART) signal (e.g., 3200 of FIG. 3B) and a corresponding pulse-per-second (PPS) signal (e.g., 3100 of FIG. 3B) to the master node 10 and/or each of the slave nodes 20-1 to 20-N.

In addition, the case where the nodes 10 and 20-1 to 20-N are located over different EVs can be understood to mean a "synchronization between nodes in different EVs". In this case, the master node 10 may correspond to a global time source, and the slave nodes 20-1 to 20-N may correspond to peripherals located over different EVs.

In the present disclosure, the term "node(s)" may mean a (network) device including a processor, memory, a communication module, an internal timer, and/or the like, and in some scenarios, the node(s) may be used interchangeably with the term "peripheral(s) except the case where a master node is described as a global time source, or a certain node may be understood as including a peripheral.

The present disclosure will be described to address two technical issues as follows:

(a) Synchronization between nodes located in the same EV;

(b) Synchronization between nodes located in different EVs; and

Synchronization Between Nodes Located in the Same EV

In this section, a method or system for controlling time synchronization between nodes located in the same EV are described.

Figure 2A:
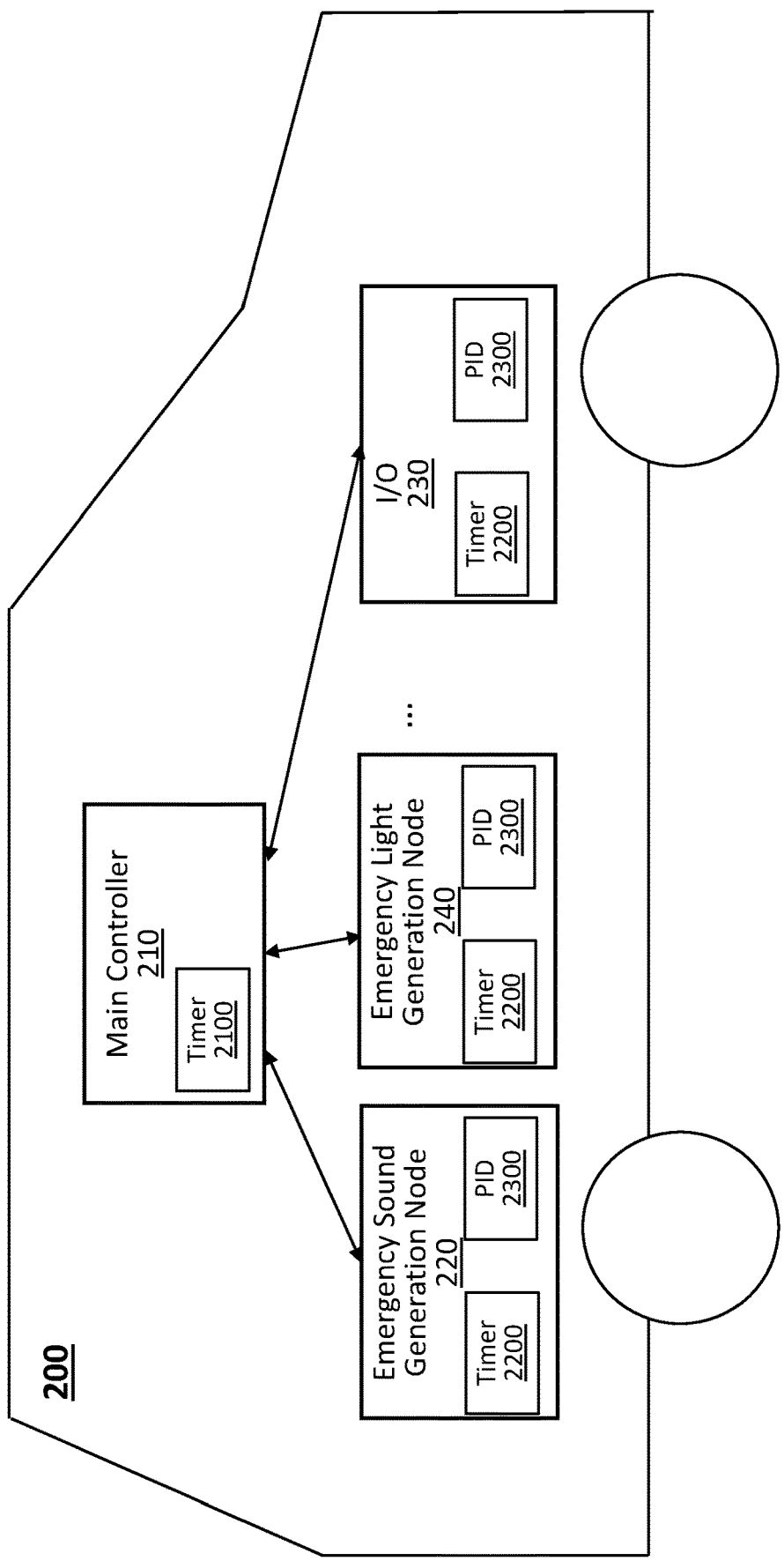
FIG. 2A is a block diagram illustrating an example synchronization system according to an embodiment of the present disclosure.
Figure 2B:
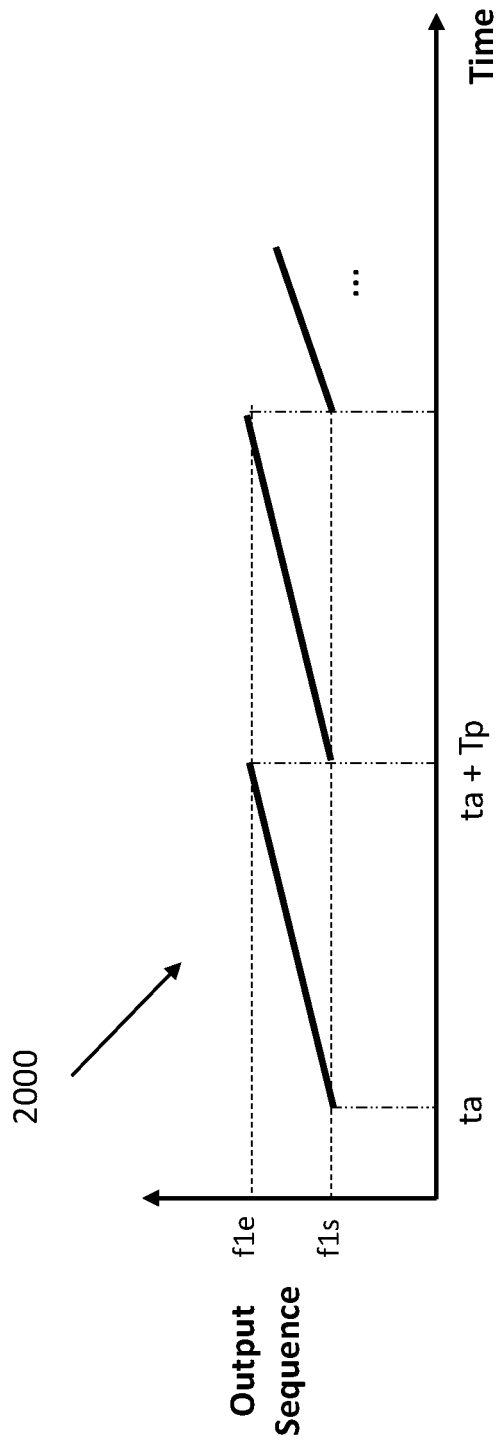
FIG. 2B is a view illustrating an example output sequence for generating a tone signal according to an embodiment of the present disclosure.

FIG. 2A is a block diagram illustrating an example synchronization system according to an embodiment of the present disclosure. FIG. 2B is a view illustrating an example output sequence for generating a tone signal according to an embodiment of the present disclosure.

In FIG. 2A, the main controller 210 may include a processor (not shown), a memory (not shown) coupled to the processor, a communication device (not shown), and an optional master timer 2100. Further, each peripheral such as an emergency sound generation node 220 (e.g., siren), an emergency light generation node 230 (e.g., a light bar), an IO device 240, or the like, may include a processor (not shown), a memory (not shown) coupled to the processor, a communication device (not shown), and a local timer 2200. In some embodiments, the master timer 2100 which provides a global time used for the synchronization may not be a part of the master node 10, instead the global time may be obtained using an external time source such as the satellite based time source. In one embodiment, the main controller 210 can be a microcontroller, a compact integrated circuit including a processor, memory and I/O devices on a single chip.

While it is illustrated in FIG. 2A that each node has its own processor and memory for the sake of description, embodiments of the present disclosure are not limited thereto. For example, there may be a processor (not shown) and a memory (not shown), each of which is shared to control or perform processing jobs associated with each node 210 to 240.

Referring still to FIG. 2A, the main controller 210 obtains a global time from either the master timer implemented therein or an external time source. The main controller 210 generates a first synchronization message and transmits the same to each peripheral 220 to 240. Next, using the master timer 2100, the main controller 210 determines a tx time at which the first synchronization message is transmitted and stores a tx timestamp corresponding to the determined tx time into the memory; for example, when a transmission interrupt signal, which is triggered upon transmission of the first synchronization message, is detected, the tx timestamp may be determined.

Next, each peripheral 220 to 240 (e.g., processor thereof) receives the first synchronization message from the main controller 210, determines a rx time (using the local timer 2200) at which the first synchronization message is received and store a rx timestamp corresponding to the rx time into the memory; for example, when a reception interrupt signal, which triggered upon reception of the first synchronization message, is detected, the rx timestamp may be determined.

After a predetermined period of time (e.g., $T_p$), the main controller 210 reads the tx timestamp from the memory, generates a second synchronization message containing the tx timestamp, and transmits the same to each peripheral 220 to 240. Next, each peripheral 220 to 240 receives the second synchronization message and retrieves the tx timestamp from the received second synchronization message. Also, each peripheral 220 to 240 determines a current local time at which the second synchronization message is received.

Next, each peripheral 220 to 240 compares the tx timestamp contained in the second synchronization message with the rx timestamp to determine a time difference $\Delta T$ between the tx timestamp and the rx timestamp. In addition, each peripheral 220 to 240 determines a global time by adding the time difference $\Delta T$ to the determined current local time, so that a local time of each peripheral 220 to 240 can be synchronized to the global time of the main controller 210 using the following equation:

$$\text{Global Time} = \text{Current Local Time} + (tx\ \text{timestamp} - rx\ \text{timestamp}) \qquad \text{Equation 1,}$$

These two events regarding the tx timestamp and the rx timestamp determined and stored from a transmit side (e.g., main controller) and a receive side (e.g., each peripheral) both correspond to the same transmission which happened at one instance in time. Given that the main controller and the peripherals are located in the same EV, a delay, during the synchronization messages being transmitted, may be negligible, so that the only difference between the tx timestamp and rx timestamp can be contributed to a synchronization variance therebetween.

The synchronization made based on Equation 1 may immediately bring the main controller 210 and each peripheral 220 to 240 to be synchronized within, e.g., 1 μsec.

Even if the main controller 210 and each peripheral 220 to 240 are synchronized based on Equation 1, a further synchronization error may occur until the next round of synchronization due to inconsistent drifts between the master timer 2100 and the local timer 2200 which are caused by external factors such as temperature.

This additional synchronization error occurs over the course of the next predetermined time period $T_p$ where the local timer 2200 of each peripheral 220 to 240 may drift from the master timer 2100 of the main controller 210 due to differences in rate that their timers increment. The predetermined time period $T_p$ is a period for which synchronization messages are transmitted and thus, the synchronization between nodes are performed. The maximum drift that can occur is equal to the maximum difference in the rate which the timers increment. For example, the drift can vary by up to 2% of the predetermined time period $T_p$ which would result in a maximum of, e.g., 2 msec drift when $T_p=1$ sec, between the master timer and the local timer over the course of the predetermined time period $T_p$. The accuracy of the timers can be improved using external crystals up to 0.01% of the predetermined time period $T_p$. In this case, the maximum drift will be, e.g., 10 μsec when $T_p=1$ sec.

Alternatively, a reload time of the internal timer (e.g., 80-microsecond timer) of the node can be reduced or increased to allow that node to catch up to or slow down and track the global time of the main node. For example, if each node is behind the global time of the main node by a predetermined time (e.g., a few milliseconds box), the reload time of the timer of that node can be reduced for the node to catch itself up smoothly by running the threads in the real-time operating system (RTOS) more often. Further, this can further be enhanced using a proportional-integral-derivative (PID) controller to catch up more quickly or slowly based on whether a local time of the node is far or close to the global time accordingly.

Figure 2C:
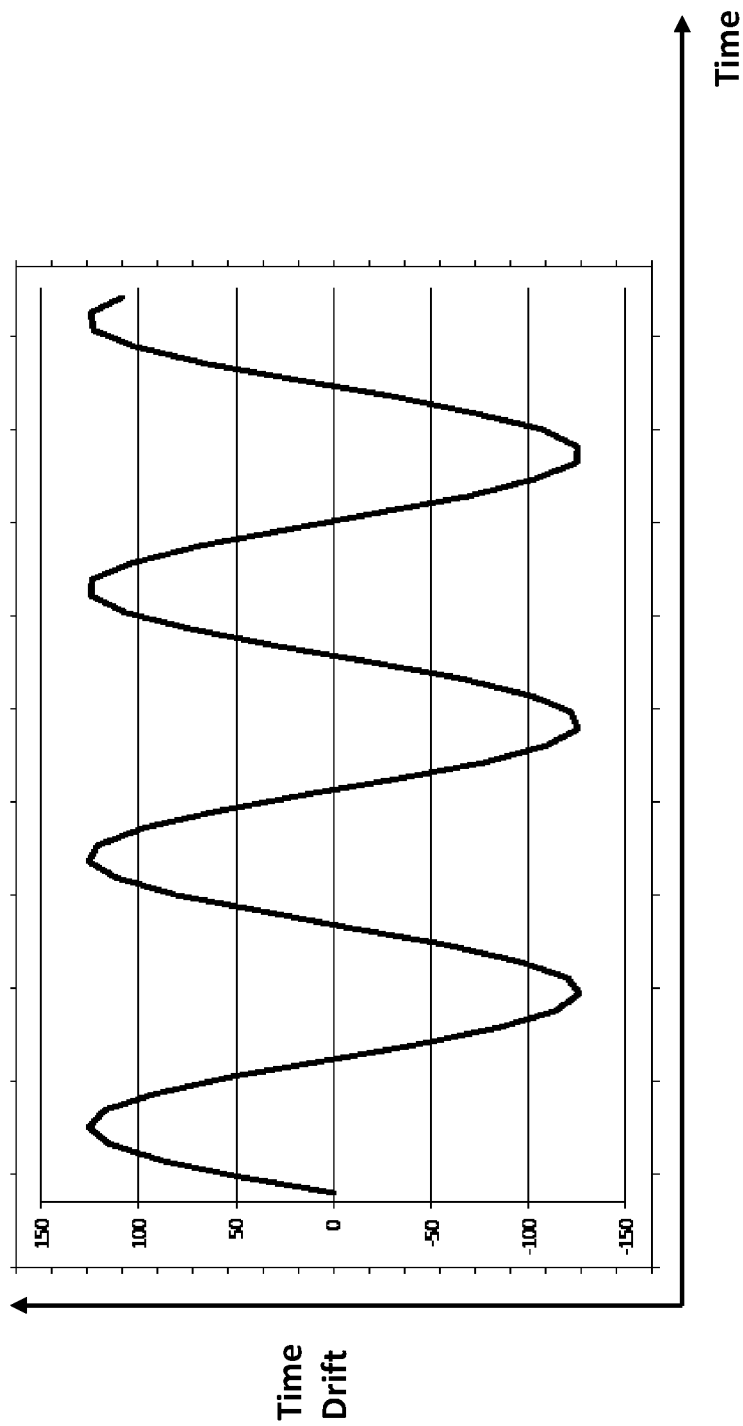
FIG. 2C is a view illustrating a drift in time between a master timer and a local timer.

In one embodiment, referring to FIG. 2A, each peripheral 220 to 240 may further include a proportional-integral-derivative (PID) controller 2300 which acts to reduce the synchronization error occurring due to the drifts between the master and local timers 2100 and 2200 and eliminate the time jump in slave nodes upon the reception of synchronization messages. The PID controller 2300 is configured to compensate for the drift between the master and local timers 2100 and 2200 using Equation 2. The PID controller 2300 can be implemented using a hardware processor or based on a field-programmable gate array (FPGA) design, but in other embodiments, it may be implemented based on program codes which are stored in the memory or in the hardware processor, and executed by the hardware processor.

$$u(t) = K_p e(t) + K_i \int_0^t e(t')dt' + K_d \frac{de(t)}{dt},$$ Equation 2 where u(t) is equal to the adjustment amount to a reload value of the local timer 2200 in each peripheral 220 to 240. $K_p$, $K_i$, and $K_d$ are all constants which are tuned in firmware to smooth out the drift between the master and local timers 2100 and 2200 over the predetermined period of time $T_p$. e(t) represents a time difference between the tx timestamp and the rx timestamp. In Equation 2, $K_p$ acts as an immediate addition or subtraction of time to the local timer 2200 based on e(t) which is the difference between the local and master node, so that the timer 2200 can slow down or speed up to let it catch up with the master timer 2100. $K_i$ is multiplied by an accumulated error in drifts and is used to correct a small error that occurs over time where the local timer 2200 is running at the same rate as the master timer 2100, but is just slightly ahead of or behind the master timer 2100 in time. Next, $K_d$ is multiplied by the change in drifts between the last two calculated errors in order to resist the change of the element $K_p e(t)$ of Equation 2 as the timers get closer and closer together to prevent overshoot, and the element $$K_d \frac{de(t)}{dt}$$

decreases as the local timer 2200 is altered to have the drift from the master timer 2100 to be zero. After tuning the rate of the local timer 2200, the drift error will appear sinusoidal remaining centered around zero in drift as the local timer 2200 couples tightly to the master timer 2100, as shown in FIG. 2C.

Figure 6:
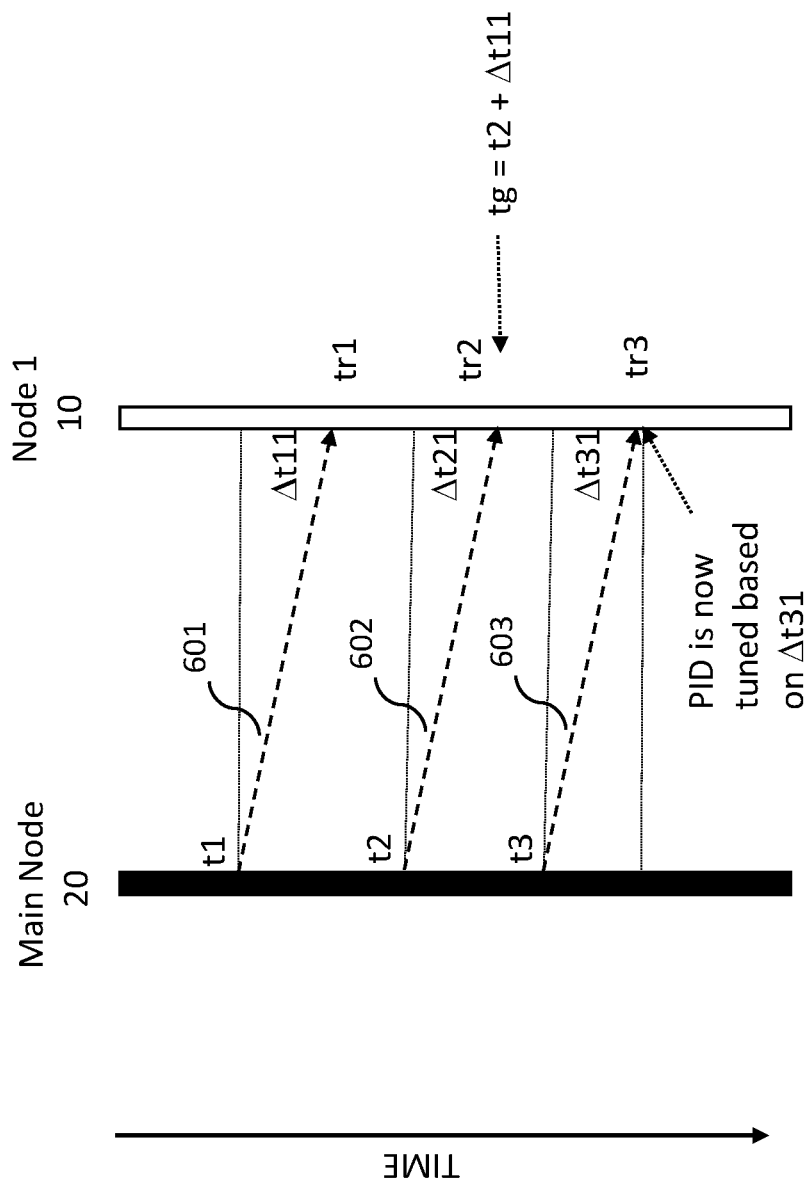
FIG. 6 is a view illustrating an example algorithm to be performed for synchronization for sirens to prevent audible jumps in tones according to another embodiment of the present disclosure.

FIG. 6 is a view illustrating an example algorithm to be performed for synchronization according to another embodiment of the present disclosure. This embodiment is preferred for sirens to prevent audible jumps in tones, but is also applicable to other components requiring synchronization, e.g., lights.

The PID controller can be further enhanced by allowing it to self-tune itself in real time rather than using stored PID values as well as preset maximums and minimums. This allows a single PID controller to be used across multiple devices in varying temperature ranges regardless of the accuracy of each devices clock source due to using an external or internal crystal etc. This is also disclosed in related U.S. application Ser. No. 16/815,988, filed Mar. 11, 2020, the entire contents of which are incorporated herein by reference.

When syncing using a PID controller as opposed to just instantaneously jumping to a new timestamp using the method already specified above, three consecutive sync messages 601/602/603 are required as opposed to two (i.e., 601/602). This is due to the need for the PID controller to be tuned before use allowing for the same PID controller with different numbers to be used across varying temperature ranges and varying drifts between the main and external node. The first two sync messages and the processes performed are the same as those described using the instantaneous jump method. That is, the global time tg is calculated using two synch messages 601/602, i.e., Global Time=Current Local Time+(tx timestamp−rx timestamp).

Once this difference is added to the internal clock in node and the two devices 10/20 are in theory perfectly synced for that instance in time, slow drift is still occurring from the main node 20 based on the difference in running rates between the oscillators on the two nodes 10/20. To prevent the need for further jumps, which is more perceptible in a siren jump, this variance in running rates must be eliminated which is where the PID controller is utilized.

One more message is therefore needed in order to see the difference of how far the slave node was from the main node in time initially as compared to how far it is from the main nodes clock one sync message later. The main node 20 transmits a third sync message 603 to the node 10. The third sync message 603 includes a third transmit time t3 at which the main node 20 transmit completed for sync the previous sync message, i.e., 602. The third synch message 603 is received at the local node 10 and the receive time tr3 is recorded.

For example, if the time difference was initially 50 ms and it is now 55 ms one sync message later, this indicates that drift is occurring at a rate of 5 ms. The PID controller is not necessarily meant to eliminate the 55 ms difference, but adjust for the continuous 5 ms drift which is occurring after the jump. Thus, the P, I, and D values can be tuned based on a percentage of this drift and also set to slow down or speed up the clock in the local node to bring the devices into synchronization without an abrupt jump. In addition, a maximum allowable drift can be calculated as a percentage of this drift, which, if exceed, will trigger the need for a new jump and thereafter a new tuning will be needed in order to allow the PID controller the ability to compensate for the new drift, which is often caused by temperature variations or some other external factor. The PID controller and the values used for tuning can then be used to alter the auto reload register time of that clock in the local node as to what constitutes 1 ms for instance and speed it up or slow it down so that its 1 ms now happens at a slightly different rate as measured by external devices; but, the internal tasks to the local node still treat this time as if 1 ms has occurred slowing down or speeding up there tasks in real time to compensate. Thus, the PID controller 2300 allows for tuning the rate that the local timer 2200 increments by actively adjusting the reload value of its clock based on Equation 2.

Among the peripherals 220 to 240, the emergency sound generation node 220 generates an emergency sound based on an output sequence 2000 stored in a memory, as exemplary shown in FIG. 2B. The output sequence is a sequence upon which the emergency sound generation node 220 is supposed to play the emergency sound. More particularly, a processor (not shown) of the emergency sound generation node 220 reads the output sequence 2000 from a memory (not shown) and generates a tone signal based on the output sequence 2000. The tone signal may be amplified and played through a speaker (not shown). In this case, the tone signal may include volume level information and/or frequency information.

In some embodiments, in case of the peripherals 220 to 240 includes another emergency sound generation node (not shown), the another emergency sound generation node can also be synchronized to the main controller 210 and thus, synchronized to the emergency sound generation node 220. The another emergency sound generation node may also generate another tone signal based on another output sequence, and the another tone signal generated by the another emergency sound generation node can be synchronized to the tone signal generated by the emergency sound generation node 220 to generate a combined emergency sound, which make the sound more noticeable to drivers.

The output sequence 2000 is repeated for every predetermined time period which, for example, is equal to the predetermined time period $T_p$ for which the synchronization messages are sent and the synchronizations are performed. A length of the output sequence 2000 is equal to that of the another output sequence.

Examples of the output sequences, the tone signals and example embodiments as to how an emergency sound or a combined emergency sound is generated based on the synchronized global time are also described in Applicant's Provisional Application No. 62/816,958 filed on Mar. 12, 2019, the entire disclosure of which is incorporated by reference herein.

In some embodiments, the emergency sound generation node 220 generates a tone signal based on the output sequence 2000 to generate an emergency sound, and a processor (not shown) of the emergency light generation node 230 generates another tone signal based on another output sequence (not shown) to generate an emergency flash light. In this case, the emergency light generation node 230 can also be synchronized to the main controller 210 and thus, synchronized to the emergency sound generation node 220. The processor of the emergency light generation node 230 may also generate another tone signal based on another output sequence, and thus the another tone signal generated by the emergency light generation node 230 can be synchronized to the tone signal generated by the emergency sound generation node 220 to respectively generate an emergency flash light and an emergency sound which are played in a synchronization manner, which make the light and the sound more noticeable to drivers. The another tone signal generated by the emergency light generation node 230 may be amplified and played through a light bar (not shown). In this case, the another tone signal may include light intensity level information and/or frequency information. The aforementioned synchronization methods allow the system to resync the tone signals globally between the emergency sound generation nodes and/or the emergency light generation node to play that same pattern in the same phase, making them more noticeable to drivers.

Synchronization Between Nodes Located Over Different Emergency Vehicles

In this section, a method or system for controlling synchronization between nodes located over different EVs are described.

Figure 3A:
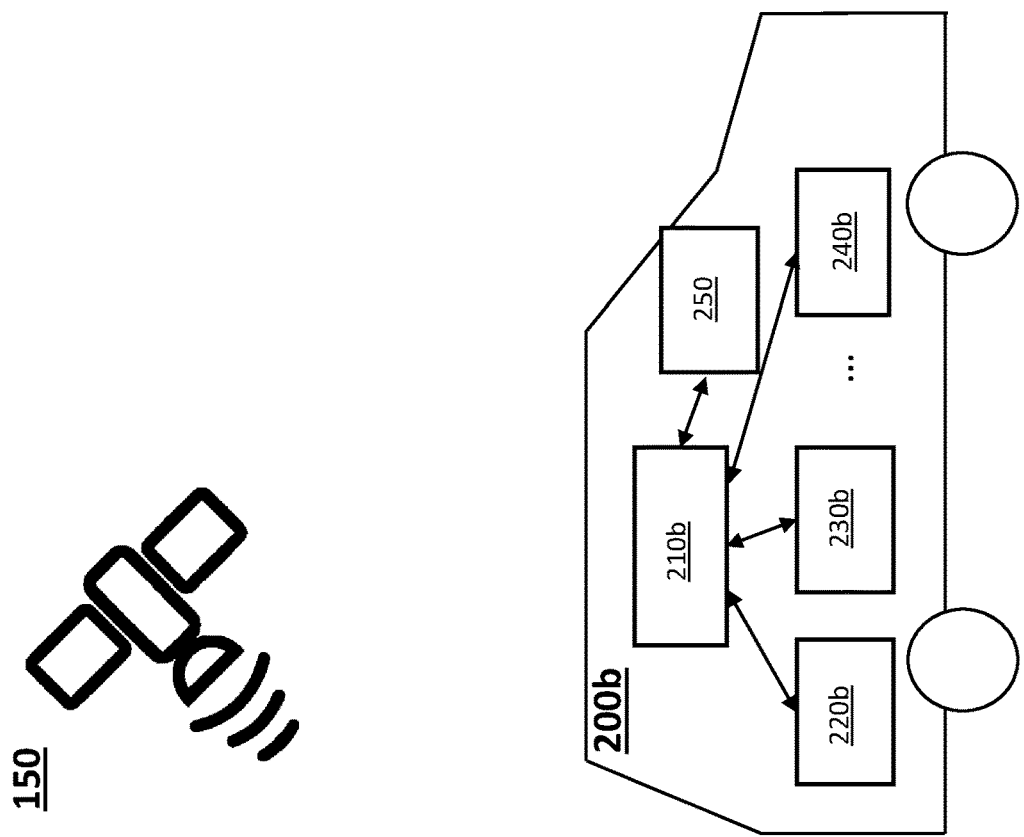
FIG. 3A is a block diagram illustrating an example synchronization system according to an embodiment of the present disclosure.
Figure 3A:
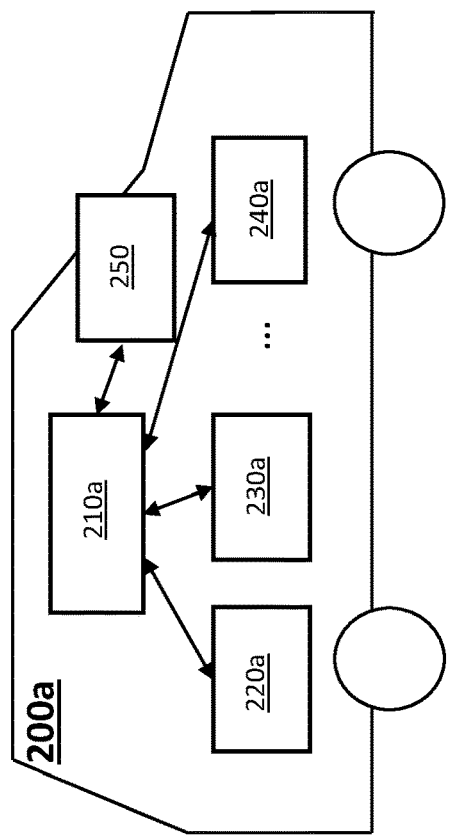
Figure 3B:
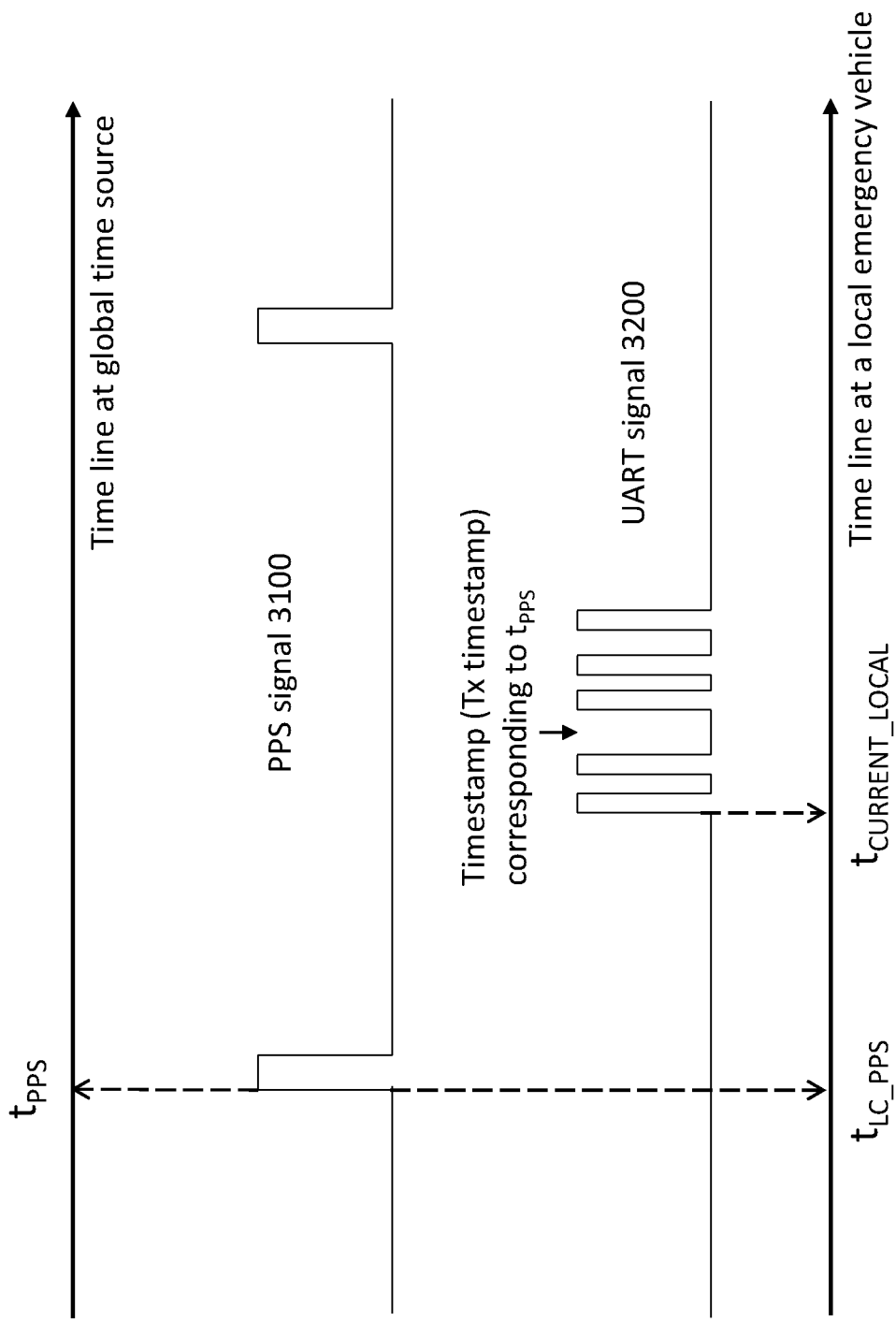
FIG. 3B is a view illustrating an example timing diagram of signals transmitted by a global time source and each emergency vehicle according to an embodiment of the present disclosure.

FIG. 3A is a block diagram illustrating an example synchronization system according to an embodiment of the present disclosure. FIG. 3B is a view illustrating an example timing diagram of signals transmitted by a global time source and each emergency vehicle according to an embodiment of the present disclosure.

Referring to FIG. 3A, two different EVs 200a and 200b are illustrated only for the sake of simplicity. In the present disclosure, the number of EVs to be synchronized is not limited thereto. Similar to the EV 200 of FIG. 2A, each of the EVs 200a and 200b includes one or more nodes (or peripherals) such as a main controller, an emergency sound generation node, an emergency light generation node, an I/O device, or the like and thus, duplicate description thereof will be omitted for the sake of simplicity. In this scenario, a node(s) of the EV 200a and a node(s) of the EV 200b is(are) synchronized to the global time source 150, so that the node(s) of the EV 200a and the node(s) of the EV 200b is(are) all synchronized one to another, which allows for generating more noticeable emergency sound and/or light, as described in the previous section.

In one embodiment, referring still to FIG. 3A, the global time source can be a GNSS transmitter 150. In this case, a GNSS receiver 250 for receiving signals from the GNSS transmitter 150 can be attached or included in each EV 200a and 200b, more particularly, e.g., a main controller. Referring further to FIG. 3B, the GNSS transmitter 150 transmits a PPS signal 3100 as well as an UART signal 3200 containing a timestamp $t_{PP\_S}$ corresponding to a transmission of the PPS signal 3100 (e.g., rising edge of the PPS signal) with an accuracy of 100 nsec to the main controller of each EV via the GNSS receiver 250. In case of the global time source is implemented with any one other than the GNSS, the GNSS transmitter 150 and the GNSS receiver 250 can be replaced accordingly to transmit/receive corresponding signals.

Referring to FIG. 3B, illustrated are example timing diagrams of the UART signal 3200 and the PPS signal 3100 which show only a specific period for the sake of simplicity, but will be repeated periodically.

For example, as shown in FIG. 3B, at the GNSS transmitter 150, the PPS signal 3100 has a rising peak at a first time $t_{PPS}$, and the UART signal 3200 containing the timestamp which corresponds to the rising peak of the PPS signal 3100 is generated. After then, the PPS signal 3100 and the UART signal 3200 are transmitted. Upon the transmission of the PPS signal 3100, a processor (not shown) of the GNSS transmitter 150 determines the first time $t_{PPS}$ corresponding to the rising edge of the PPS signal 3100, and then transmits the UART signal 3200 containing the timestamp of the first time $t_{PPS}$ as a synchronization message.

Each EV 200a and 200b includes an internal timer (or input compare timer) (not shown) in the main controller (e.g., 210a or 210b) or connected thereto. When the main controller receives the PPS signal 3100, the internal timer is triggered upon the rising edge of the received PPS signal 3100 and stores a timestamp $t_{LC\_PPS}$ of the internal timer into a memory. Next, when the main controller receives the UART signal 3200, a current local time $t_{CURRENT\_LOCAL}$ of the internal timer upon the reception of the UART signal 3200 is determined and stored, and the timestamp $t_{PPS}$ contained in the UART signal 3200 is read and stored.

Next, the main controller determines a global time by adding a time difference between the current local time $t_{CURRENT\_LOCAL}$ and the stored timestamp $t_{LC\_PPS}$ to the determined timestamp $t_{PPS}$, as shown with Equation 3, so that a local time of the main controller can be synchronized to the global time provided by the global time source 150.

Global Time=$t_{PPS}$+($t_{CURRENT\_LOCAL}$−$t_{LC\_PPS}$)  Equation 3.

Similar to what is described in the previous section, the UART signals 3200 are transmitted to each EV 200a and 200b every a predetermined period (e.g., $T_p$), there will occur some drifts of the internal timer of each EV 200a and 200b with respect to the global time source 150 over the course of the next predetermined time period.

Because the global timer of the GNSS transmitter 150 has a max variance of 100 nsec, a difference between a time at which the PPS signal is transmitted and the corresponding timestamp (e.g., $t_{PPS}$) contained in the UART signal 3200 may be relatively negligible with respect to the accuracy of the global time source and can thus be ignored.

On the other hand, the internal timer of each EV 200a and 200b has a relatively large variance (e.g., 1% of the predetermined time period $T_p$ (e.g., 1 msec when $T_p$=1 sec) over the course of the next predetermined time for which the UART signals 3200 are transmitted.

In one embodiment, this variance of the internal timer at each EV 200a and 200b can be reduced to, e.g., approximately 0.005% of the predetermined time period $T_p$ (or 5 μsec when $T_p$=1 sec) if an external oscillator is used for the internal timer.

Similar to what is described in the previous section, the main controller may further include a PID controller (not shown) which acts to reduce the synchronization error occurring due to the drifts between the global time source 150 and the internal timer. Thus, duplicate of description will be omitted for the sake of simplicity.

Although it is illustrated in FIG. 3A that the global time source 150 such as the satellite based time source is used for synchronization between vehicles. However, embodiments of the present disclosure are not limited thereto. For example, a precision time protocol demon (PTPd) stack as specified in IEEE 1588 can be used to establish any node(s) as a master node and leave it up to the peripherals to determine the most accurate source for synchronizing them. This leaves the instant synchronization method disclosed herein expandable in the future and free of and architectural requirements. Although currently all of systems using exclusively CAN to communicate between peripherals are limited to only one master, architectures more commonly seen in Ethernet applications containing multiple masters and a switch could also be used to synchronize devices in the future if higher data rates are required. The method for synchronization would still be the same regardless of communication scheme. The minimum parts needed to achieve synchronization using this method are two microcontrollers connected by a data line where the transmission and reception time of messages is determinant. To synchronize between vehicles there is needed a further addition of a global time source on the side of one of the microcontrollers.

In one embodiment, once a corresponding main controller of each of the EV 200a and 200b is synchronized to the global time source 150, peripherals in each EV 200a and 200b will be synchronized to the main controller. In this case, the main controller 210a (or 210b) of each EV 200a and 200b of FIG. 3A may correspond to the main controller 210 of FIG. 2A, and the peripherals 220a to 240a (or 220b to 240b) of each EV 200a and 200b may correspond to the peripherals 210 to 240 of FIG. 2A. Thus, for synchronization between the peripherals 210a to 240a (or the peripherals 210b to 240b), similar methods described with reference to FIG. 2A can be applied to the instant embodiment with reference to FIG. 3A. Thus, duplicate description thereof will be omitted for the sake of simplicity. Further, it should be noted that once the peripherals 210a to 240a are synchronized in the EV 200a, and the peripherals 210b to 240b are synchronized in the EV 200b, it can be understood that the peripherals 210a to 240a of the EV 200a and the peripherals 210b to 240b of the EV 200b are all synchronized one to another.

In addition, in order to make an emergency sound and/or an emergency light more noticeable, any combinations of the peripherals 210a to 240a and 210b to 240b can be applied. For example, an emergency sound generation node 220a of the EV 200a can be synchronized to an emergency sound generation node 220b of the EV 200b to generate a combined emergency sound where their corresponding tone signals are synchronized each other to generate the same pattern of the emergency sound, similarly what is described in the previous section with reference to FIG. 2A. In a further example, an emergency sound generation node 220a of the EV 200a can be synchronized to an emergency light generation node 230b of the EV 200b to generate an emergency sound and an emergency light where their tone signals are synchronized each other to have the emergency sound and the emergency light the same pattern as each other, similarly what is described in the previous section with reference to FIG. 2A.

Hereinafter, examples of how peripherals (e.g., 220 to 240 of FIG. 2A or 220*a* to 240*a*, 220*b* to 240*b* of FIG. 3A) located in the same EV or over different EVs will work after they are synchronized to the global time.

In one embodiment, in order to generate a tone signal based on an output sequence (e.g., 2000 of FIG. 2B), each of the peripherals will find out a certain point within an output sequence at which their actions are performed. For example, each peripheral is configured to calculate a start point in the output sequence at which the tone signal shall start to be generated.

This start point is referred to as a TimeIntoSequence which represents the tone signal shall start to be generated in the sequence cycle that simulates its repetitive pattern. TimeIntoSequence can be calculated using the following Equation:

$$\text{TimeIntoSequence} = ((\text{DegreeOfPhase}/360) \times \text{TotalSequenceTime}) + \text{CurrentGlobalTime} \bmod \text{TotalSequenceTime} \quad \text{Equation 4,}$$

where DegreeOfPhase represent a phase in degree where the playback of the sequence would have been. TotalSequenceTime is a predetermined time period where the sequence exists. CurrentGlobalTime represents a current global time determined at each peripheral.

TimeIntoSequence to be determined using Equation 4 will tell the system exactly a certain time point in the output sequence at which the tone signal has to start rendering the sequence and repeated continuously since then. Because the global time of zero is the same for all peripherals using the aforementioned synchronization methods, all peripherals synchronized in either the same EV or different EVs, will begin a sequence of the same period and phase exactly in synchronization with one another regardless of when the sequences begin.

Figure 4:
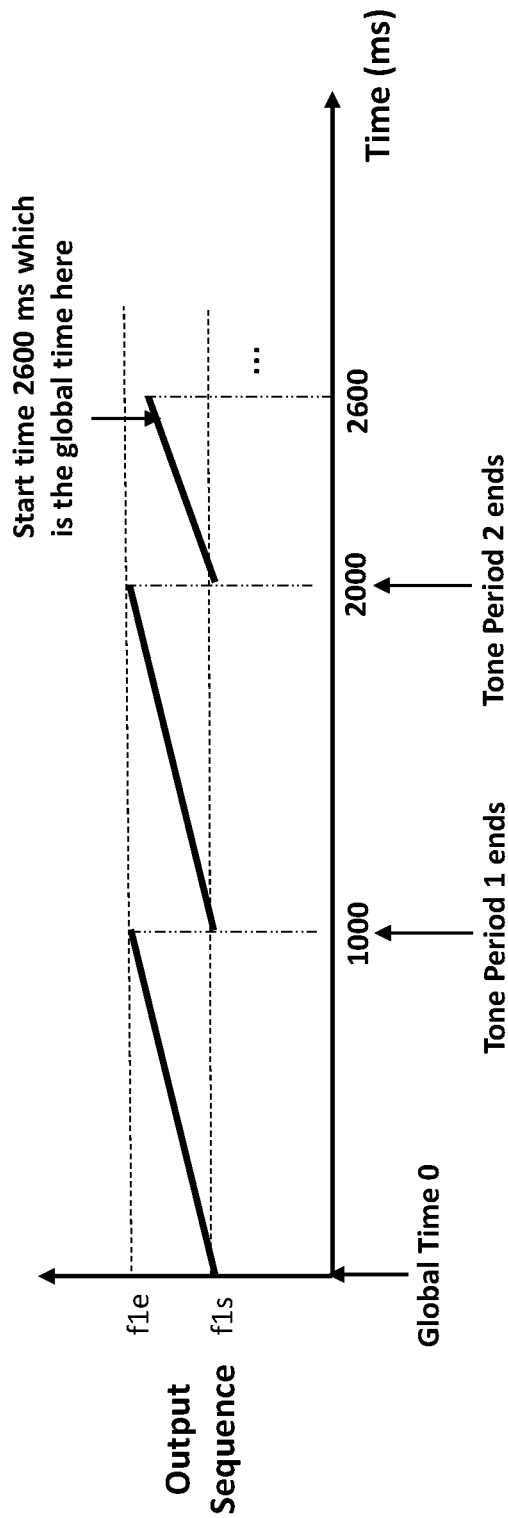
FIG. 4 is a view illustrating an example timing diagram for determining a time into tone according to an embodiment of the present disclosure.

FIG. 4 is a view illustrating an example timing diagram for determining a TimeIntoSequence according to an embodiment of the present disclosure. For example, referring to FIG. 4, the sequence period (e.g., TotalSequenceTime) repeats for every 1000 msec, the sequence is played at degreeOfPhase of 0, at the global time zero, and the global time is 2600 msec.

In one embodiment, the peripherals may calculate a certain point at which they should start in a sequence for every predetermined time period Tp and/or jump to the appropriate output state for that time as defined by the sequence definition. More particularly, if the peripherals use an internal PID controller or PTPD, it may allow the peripherals to continue playing their sequences normally the same as they would in an asynchronous system since they would exactly know where they should start. Further, the local timer of each peripheral will be updated in the background to keep its output synchronous in the overall system.

In addition, the aforementioned synchronization method can be used for Cencom™ Core sirens and implementing hardware to achieve absolute synchronization between tone signals. This is done as by playing a sequence internally in one siren and then outputting it via a mux to an Auxillary-out connector on that board. A next siren in the system can then select to play a sequence at its Auxillary-in connected to an output of its main amplifier which receives a tone provided from the previous siren as well as pass the sequence through to another siren in the system. This allows the tone to be produced only once and played synchronously on every siren in the connected system.

Because some users will not want sequences starting in the middle of a sequence but to still have all peripherals in a system synchronized with one another. In this case, a further calculation can be done to figure out what phase, according to a global time stamp of zero, would the sequence have to start so as to start at the beginning immediately using Equation 4. Once this is done, it can be remembered so that any sequence in the future of the same period or a multiple or division of that period and phase can be started in the same phase to achieve in vehicle synchronization between peripherals in a system as well as start from the beginning of a sequence. In addition, there is an option to play the sequence immediately without doing any calculation to make every peripheral in the vehicle run sequences asynchronously.

Figure 5:
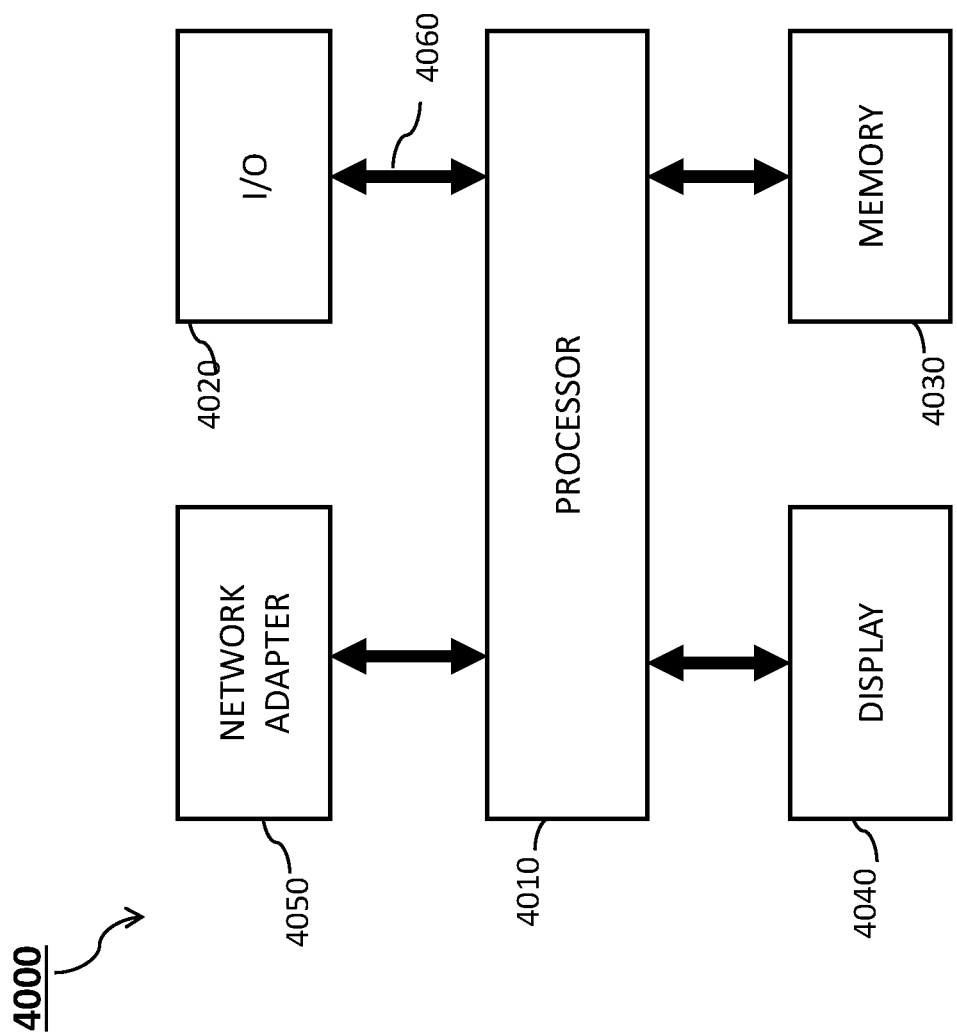
FIG. 5 is a block diagram of a computing system according to an embodiment of the present disclosure.

FIG. 5 is a block diagram of a computing system 4000 according to an exemplary embodiment of the present disclosure.

Referring to FIG. 5, the computing system 4000 may be used as a platform for performing: the functions or operations described hereinabove with respect to at least one of the systems of FIGS. 2A and 3A.

Referring to FIG. 8, the computing system 4000 may include a processor 4010, I/O devices 4020, a memory system 4030, a display device 4040, and/or a network adaptor 4050.

The processor 4010 may drive the I/O devices 4020, the memory system 4030, the display device 4040, and/or the network adaptor 4050 through a bus 4060.

The computing system 4000 may include a program module for performing: the functions or operations described hereinabove with respect to at least one of the systems of FIGS. 2A and 3A. For example, the program module may include routines, programs, objects, components, logic, data structures, or the like, for performing particular tasks or implement particular abstract data types. The processor (e.g., 4010) of the computing system 4000 may execute instructions written in the program module to perform: the functions or operations described hereinabove with respect to at least one of the systems of FIGS. 2A and 3A. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) may communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, Zig Bee, or the like.

Exemplary embodiments of the present disclosure may include a system, a method, and/or a non-transitory computer readable storage medium. The non-transitory computer readable storage medium (e.g., the memory system 4030) has computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, system (or device), and computer program products (or computer readable medium). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A synchronization system, comprising:
a first node configured to:
  transmit a first synchronization message;
  determine a first time at which the first synchronization message is transmitted;
  transmit a second synchronization message containing a tx timestamp corresponding to the first time;
a second node configured to:
  receive the first synchronization message from the first node;
  determine a second time at which the first synchronization message is received and store a rx timestamp corresponding the second time;
  receive the second synchronization message from the first node;
  determine a current local time at which the second synchronization message is received;
  read the tx timestamp in the second synchronization message;
  adjust the current local time of the second node by adding a difference between the tx timestamp and the rx timestamp to the current local time; and
  setting the adjusted current local time as a global time.

2. The system of claim 1, wherein the first node and the second node are located in an emergency vehicle.

3. The system of claim 2, wherein the first node is a main controller, and the second node is one of an emergency sound generator, an emergency light generator, and an I/O device.

4. The system of claim 1, wherein the first node includes a master timer, and the second node includes a local timer, and
wherein the second node further includes a PID controller to compensate a drift over time between the master timer and the local timers drift in rates between one another.

5. The system of claim 4, wherein the PID controller is configured to tune a rate at which the local timer of the slave node increments by actively adjusting a reload value of the local timer based on the following equation:

$$u(t) = K_p e(t) + K_i \int_0^t e(t')dt' + K_d \frac{de(t)}{dt},$$

wherein u(t) is an adjustment amount added to the reload value of the local timer, $K_p$, $K_i$, and $K_d$ are constants, and e(t) is the difference between the tx timestamp and the rx timestamp.

6. The system of claim 1, further comprising:
a third node configured to:
  receive the first synchronization message from the first node;
  determine a third time at which the first synchronization message is received and store another rx timestamp corresponding to the third time;
  receive the second synchronization message from the first node;
  determine another current local time at which the second synchronization message is received;
  read the tx timestamp in the second synchronization message;
  adjust the another current local time of the third node by adding another difference between the tx timestamp and the another rx timestamp; and
  set the adjusted another current local time as another global time,
wherein the global time set by the second node is equal to the another global time set by the third node, so that the second node and the third node are synchronized one to another via the first node.

7. The system of claim 6, wherein the second node including a first emergency sound generator generates a first tone signal based on a first output sequence stored in at least one memory, and the third node including a second emergency sound generator generates a second tone signal based on a second output sequence stored in the at least one memory,
wherein each of the first output sequence and the second output sequence is repeated for every predetermined time period, and during the predetermined time period, a length of the first output sequence is equal to that of the second output sequence.

8. The system of claim 7, wherein the first tone signal and the second tone signal are synchronized one to another to generate a combined emergency sound.

9. The system of claim 6, wherein the second node including an emergency sound generator generates a first tone signal based on a first output sequence stored in at least one memory, and the third node including an emergency light generator generates a second tone signal based on a second output sequence stored in the at least one memory,
wherein each of the first output sequence and the second output sequence is repeated for every predetermined time period, and during the predetermined time period, a length of the first output sequence is equal to that of the second output sequence.

10. The system of claim 9, wherein the first tone signal and the second tone signal respectively generate an emergency sound and an emergency light synchronized one to another.

11. The system of claim 9, wherein the first output sequence includes sound volume level information,
wherein to generate the first tone signal based on the first output sequence stored in the at least one memory, the second node is configured to calculate a start point in the first output sequence at which the first tone signal starts to be generated, and
wherein to generate the second tone signal based on the second output sequence stored in the at least one memory, the third node is configured to calculate another start point in the second output sequence at which the second tone signal starts to be generated, wherein the start point in the first output sequence calculated by the second node is equal to the another start point in the second output sequence calculated by the third node.

12. The system of claim 1, wherein the first node transmits the first and second synchronization messages over a controller area network (CAN).

13. The system of claim 1, wherein
the first node is further configured to:
transmit a third synchronization message containing a tx timestamp, and
the second node is further configured to:
receive the third synchronization message,
read the tx timestamp in the third synchronization message,
adjust the current local time of the second node by adjusting for a difference between the tx timestamp of the third synchronization message and the rx timestamp of the second synchronization message, and
set the adjusted current local time as the global time.

14. A synchronization method, comprising:
transmitting, by a first node, a first synchronization message;
determining, by the first node, a first time at which the first synchronization message is transmitted;
transmitting, by the first node, a second synchronization message containing a tx timestamp corresponding to the first time;
receiving, by a second node, the first synchronization message from the first node;
determining, by the second node, a second time at which the first synchronization message is received;
storing, by the second node, a rx timestamp corresponding the second time;
receiving, by the second node, the second synchronization message from the first node;
determining, by the second node, a current local time at which the second synchronization message is received;
reading, by the second node, the tx timestamp in the second synchronization message;
adjusting, by the second node, the current local time of the second node by adding a difference between the tx timestamp and the rx timestamp; and
setting, by the second node, the adjusted current local time as a global time.

15. The method of claim 14, further comprising:
transmitting by the first node a third synchronization message containing a tx timestamp;
receiving by the second node the third synchronization message,
reading by the second node the tx timestamp in the third synchronization message,
adjust by the second node the current local time of the second node by adjusting for a difference between the tx timestamp of the third synchronization message and the rx timestamp of the second synchronization message, and
setting by the second node the adjusted current local time as the global time.

16. A non-transitory computer-readable storage medium having computer readable program instructions, the computer readable program instructions read and executed by at least one processor for performing a synchronization method, the method comprises:
transmitting, by a first node, a first synchronization message;
determining, by the first node, a first time at which the first synchronization message is transmitted;
transmitting, by the first node, a second synchronization message containing a tx timestamp corresponding to the first time;
receiving, by a second node, the first synchronization message from the first node;
determining, by the second node, a second time at which the first synchronization message is received;
storing, by the second node, a rx timestamp corresponding the second time;
receiving, by the second node, the second synchronization message from the first node;
determining, by the second node, a current local time at which the second synchronization message is received;
reading, by the second node, the tx timestamp in the second synchronization message;
adjusting, by the second node, the current local time of the second node by adding a difference between the tx timestamp and the rx timestamp; and
setting, by the second node, the adjusted current local time as a global time.

17. The non-transitory computer-readable storage medium of claim 16 wherein the synchronization method further comprises:
transmitting by the first node a third synchronization message containing a tx timestamp;
receiving by the second node the third synchronization message,
reading by the second node the tx timestamp in the third synchronization message,
adjust by the second node the current local time of the second node by adjusting for a difference between the tx timestamp of the third synchronization message and the rx timestamp of the second synchronization message, and
setting by the second node the adjusted current local time as the global time.

18. A synchronization system, comprising:
a global time source configured to:
transmit a periodic pulse signal which is repeated for every predetermined time period;
determine a first time corresponding to a rising edge of the pulse signal;
transmit a synchronization message containing a tx timestamp corresponding to the first time;
a node configured to:
receive the period pulse signal;
trigger an internal timer upon the rising edge of the pulse signal;
determine a second time at which the internal timer is triggered;
store a trigger timestamp corresponding to the second time;
receive the synchronization message;
determine a current local time at which the synchronization message is received;
read the tx timestamp in the synchronization message;
adjust the current local time of the node by adding a difference between the tx timestamp and the trigger timestamp; and
setting the adjusted current local time as a global time.

19. The system of claim 18, further comprising:
another node configured to:
receive the period pulse signal;
trigger another internal timer upon the rising edge of the pulse signal;

determine a third time at which the another internal timer is triggered;
store another trigger timestamp corresponding to the third time;
receive the synchronization message;
determine another current local time at which the synchronization message is received;
read the tx timestamp in the synchronization message;
adjust the another current local time of the another node by adding another difference between the tx timestamp and the another trigger timestamp; and
setting the another adjusted current local time as another global time;
wherein the global time set by the node is equal to the another global time set by the another node, so that the node and the another node are synchronized one to another via the global time source.

20. The system of claim 19, wherein the global time source is a satellite based time source, and
wherein the node is located in a first emergency vehicle, and the another node is located in a second emergency vehicle.

21. The system of claim 19, wherein the node is a main controller of the first emergency vehicle, and the another node is another main controller of the second emergency vehicle.

22. The system of claim 21, wherein the first emergency vehicle further includes one or more peripherals, and when the main controller is synchronized to the global time source, the one or more peripherals are synchronized to the main controller, and
wherein the second emergency vehicle further includes another one or more peripherals, and when the another main controller is synchronized to the global time source, the another one or more peripherals are synchronized to the another main controller.

23. The system of claim 22, wherein to synchronize the one or more peripherals to the main controller, the main controller is configured:
transmit a first synchronization message;
determine a fourth time at which the first synchronization message is transmitted;
transmit a second synchronization message containing a first tx timestamp corresponding to the fourth time,
each of the one or more peripherals is configured to:
receive the first synchronization message from the main controller;
determine a fifth time at which the first synchronization message is received and store a first rx timestamp corresponding to the fifth time;
receive the second synchronization message from the main controller;
determine a first current local time at which the second synchronization message is received;
read the first tx timestamp in the first synchronization message;
adjust the first current local time of each of the one or more peripheral by adding a difference between the first tx timestamp and the first rx timestamp; and
set the adjusted first current local time as the global time.

24. The system of claim 22, wherein the one or more peripherals include an emergency sound generator, an emergency light generator, and an I/O device.

25. The system of claim 18, wherein the node further includes a PID controller or an auto-tuning PID controller of which the method for is stated above, so that upon every subsequent sync message reception, the PID controller is configured to compensate for a time drift of a local timer of the node with respect to a timer of the global time source.

26. The system of claim 22, wherein a first peripheral of the one or more peripherals including a first emergency sound generator generates a first tone signal based on a first output sequence stored in at least one memory, and a second peripheral of the another one or more peripherals including a second emergency sound generator generates a second tone signal based on a second output sequence stored in the at least one memory,
wherein each of the first output sequence and the second output sequence is repeated for every predetermined time period, and during the predetermined time period, a length of the first output sequence is equal to that of the second output sequence.

27. The system of claim 26, wherein the first tone signal and the second tone signal are synchronized one to another to generate a combined emergency sound.

28. A synchronization method, comprising:
transmitting, by a global time source, a periodic pulse signal which is repeated for every predetermined time period;
determining, by the global time source, a first time corresponding to a rising edge of the
pulse signal;
transmitting, by the global time source, a synchronization message containing a tx timestamp corresponding to the first time;
receiving, by a node, the period pulse signal;
triggering, by the node, an internal timer upon the rising edge of the pulse signal;
determining, by the node, a second time at which the internal timer is triggered;
storing, by the node, a trigger timestamp corresponding to the second time;
receiving, by the node, the synchronization message;
determining, by the node, a current local time at which the synchronization message is received;
reading, by the node, the tx timestamp in the synchronization message;
adjusting, by the node, the current local time of the node by adding a difference between the tx timestamp and the trigger timestamp; and
setting, by the node, the adjusted current local time as a global time.

29. A non-transitory computer-readable storage medium having computer readable program instructions,
the computer readable program instructions read and executed by at least one processor for performing a synchronization method, the method comprises:
transmitting, by a global time source, a periodic pulse signal which is repeated for every predetermined time period;
determining, by the global time source, a first time corresponding to a rising edge of the pulse signal;
transmitting, by the global time source, a synchronization message containing a tx timestamp corresponding to the first time;
receiving, by a node, the period pulse signal;
triggering, by the node, an internal timer upon the rising edge of the pulse signal;
determining, by the node, a second time at which the internal timer is triggered;
storing, by the node, a trigger timestamp corresponding to the second time;
receiving, by the node, the synchronization message;

determining, by the node, a current local time at which the synchronization message is received;

reading, by the node, the tx timestamp in the synchronization message;

adjusting, by the node, the current local time of the node by adding a difference between the tx timestamp and the trigger timestamp; and setting, by the node, the adjusted current local time as a global time.

\* \* \* \* \*